United States Patent
Kondapalli et al.

(10) Patent No.: US 10,200,533 B2
(45) Date of Patent: Feb. 5, 2019

(54) MEDIA ON HOLD FEATURES IN A VOIP SYSTEM

(71) Applicant: ShoreTel, Inc., Sunnyvale, CA (US)

(72) Inventors: Chakradhar Kondapalli, Austin, TX (US); Jason Miller, Austin, TX (US); Glenn Hessler, Austin, TX (US); Thomas E. Miller, Mountain View, CA (US)

(73) Assignee: Mitel Networks, Inc. DE (US)

( * ) Notice: Subject to any disclaimer, the term of this patent is extended or adjusted under 35 U.S.C. 154(b) by 0 days.

(21) Appl. No.: 15/814,285

(22) Filed: Nov. 15, 2017

(65) Prior Publication Data

US 2018/0077281 A1    Mar. 15, 2018

Related U.S. Application Data

(62) Division of application No. 15/071,472, filed on Mar. 16, 2016, now Pat. No. 9,866,688, which is a division of application No. 13/771,534, filed on Feb. 20, 2013, now Pat. No. 9,319,520.

(51) Int. Cl.
  *H04L 12/66*    (2006.01)
  *H04M 3/428*    (2006.01)
  *H04M 7/00*    (2006.01)

(52) U.S. Cl.
  CPC ......... *H04M 3/4285* (2013.01); *H04M 7/006* (2013.01)

(58) Field of Classification Search
  None
  See application file for complete search history.

(56) References Cited

U.S. PATENT DOCUMENTS

| 5,790,173 | A | 8/1998 | Strauss et al. |
| 6,885,744 | B2 | 4/2005 | Bluestein et al. |
| 7,676,032 | B2* | 3/2010 | Mark ............... H04M 3/2218 379/112.01 |
| 8,335,301 | B2 | 12/2012 | Laws et al. |
| 2002/0136384 | A1* | 9/2002 | McCormack ....... H04M 3/4285 379/215.01 |
| 2003/0035471 | A1* | 2/2003 | Pitsoulakis .......... H04M 11/062 375/222 |
| 2003/0216958 | A1* | 11/2003 | Register ............... G06Q 30/02 705/14.61 |
| 2005/0249192 | A1 | 11/2005 | Schoeneberger et al. |
| 2009/0025747 | A1 | 9/2009 | Madabhushi et al. |
| 2012/0044817 | A1 | 2/2012 | Harper et al. |

FOREIGN PATENT DOCUMENTS

WO    WO 2012/024628 A1    2/2012

\* cited by examiner

*Primary Examiner* — Ayaz R Sheikh
*Assistant Examiner* — Sori A Aga (57) ABSTRACT

A method for providing file-based media on hold (MOH) services in a Voice over Internet Protocol (VoIP) system includes selecting an MOH file and streaming digital content of the MOH file to a communication device while a call is on hold. If the call is removed from hold and placed back on hold a second time, the digital content of the MOH file is streamed to the communication device while the call is on hold the second time. The digital content is streamed from substantially a beginning of the MOH file to a first stopping point while the call is on hold the first time, and from substantially the first stopping point to a second stopping point while the call is on hold the second time.

20 Claims, 4 Drawing Sheets

MEDIA ON HOLD FEATURES IN A VOIP SYSTEM

CROSS REFERENCE TO RELATED APPLICATIONS

This application is a divisional of U.S. patent application Ser. No. 15/071,472 filed Mar. 16, 2016, which is a divisional of U.S. patent application Ser. No. 13/771,534 filed Feb. 20, 2013, both of which are incorporated herein by reference in their entirety.

FIELD OF THE INVENTION

The present invention relates generally to Voice over Internet Protocol (VoIP) systems and, more particularly, to providing media on hold (MOH) features in VoIP systems.

BACKGROUND

MOH generally refers to the playing of recorded media while a telephone call is on hold. The recorded media may include audio and/or video depending on device and system capabilities. The content of the recorded media is not limited and may include music, advertisements, instructions, or messages. The recorded media is played to fill what would otherwise be silence while a call is on hold. Large companies with multiple departments often use MOH while calls are being routed from a main receptionist to specific departments.

Traditional MOH systems are often referred to as jack-based music on hold systems. These systems typically include a jack (or port) for audio input. A source (e.g., a CD player) is connected to the port and is usually configured to play audio content continuously. When a call is placed in hold, it is connected to the source so that the audio content can be played for the caller.

Newer MOH systems may use virtual media such as MP3 files that are played using software-based media players. These systems are often referred to as file-based MOH systems. These systems may provide digital audio and/or video content. The files may be loaded onto the system or may be downloaded over a network (e.g., the Internet). When a call is placed on hold, the digital content of the file can be played for the caller.

Improvements in MOH systems are continuously sought so that callers may be provided with a positive experience while waiting on hold.

SUMMARY

Embodiments of the present invention provide improved MOH services for VoIP systems. These services may be provided to calls where at least one party is using a communication device that is part of a VoIP system. As an example, in some embodiments digital content of a media on hold file may be provided to a communication device while a call is on hold. If the call is removed from hold and then placed back on hold, the digital content provided to a caller may appear to pause while the call is removed from hold and then resume playing when the call is placed back on hold. This is particularly useful when the digital content includes a message. A user receives a portion of the message when the call is on hold a first time, and the message continues where it left off when the call is placed back on hold one or more additional times. Thus, a single message can be provided to a user in sequence rather than starting the message over each time the call is placed on hold.

In another embodiment, a VoIP system may revert to jack-based music on hold when file-based MOH services are unavailable. As an example, when a call is placed on hold, a switch (or server) in a VoIP system may search for a source for file-based MOH services that can be used to provide digital content to the caller. If no file-based MOH services are available, jack-based media may be provided. The file-based MOH services may be unavailable for any number of reasons, such as when a particular MOH file does not exist on a file-based MOH source. Also, the MOH services may be unavailable if a file-based MOH source has reached a maximum call limit and does not have resources to service additional calls.

In yet another embodiment, a periodic tone (e.g., a "beep") may be provided while a call is on hold rather than providing file-based MOH services. Providing a periodic tone requires far fewer resources and bandwidth than providing file-based MOH services. As an example, when a call is placed on hold, a server (or switch) in a VoIP system may determine how much bandwidth is available to provide file-based MOH services. If the available bandwidth is less than a predetermined threshold, a periodic tone may be provided while the call is on hold. If the available bandwidth is greater than the predetermined threshold, the file-based MOH services may be provided.

These and other embodiments are described throughout the specification and more particularly below.

DETAILED DESCRIPTION

Embodiments of the present invention provide improved MOH services in VoIP systems. Merely by way of example, in accordance with one embodiment, a call that is placed on hold and removed from hold multiple times can receive digital content from an MOH file in a sequence that appears uninterrupted. Each time the call is placed on hold, the digital content continues from where it left off a previous time the call was on hold. In accordance with another embodiment, a VoIP system may revert to jack-based music on hold when file-based MOH services are unavailable. In accordance with yet another embodiment, a periodic tone may be provided while a call is on hold rather than providing file-based MOH services. These and other embodiments are described more fully below with reference to the drawings.

Figure 1:
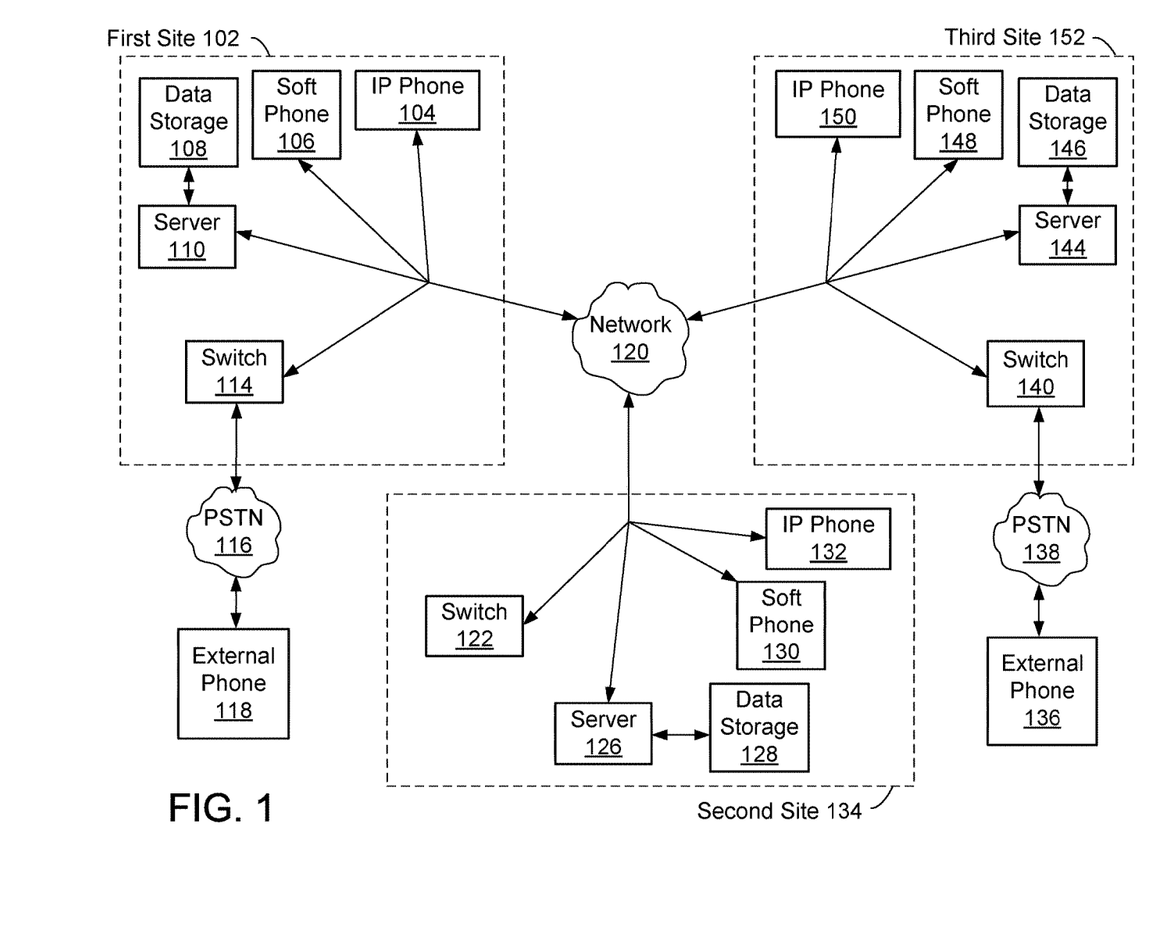
FIG. 1 is a simplified block diagram of an exemplary VoIP system in which embodiments of the present invention may be implemented.

FIG. 1 is a simplified block diagram of an exemplary VoIP system in which embodiments of the present invention may be implemented. The system illustrated in FIG. 1 includes three groupings of devices labeled as first site 102, second site 134, and third site 152. As used herein, a site represents a grouping of resources. The resources may be grouped according to location, in which case different sites may be physically distinct from each other, or they may be grouped based on other factors, in which case different sites may or may not be physically distinct from each other. While the system illustrated in FIG. 1 has three sites that each includes similar devices, embodiments of the present invention are not so limited. For example, embodiments of the present invention may be implemented in systems with more or fewer than the three sites that are included in this example, and each site may include different devices and configurations compared to the other sites in the system.

In this example, the first site 102, the second site 134, and the third site 152 are each communicatively coupled via a network 120. The network 120 may be the Internet or another packet switched network over which the VoIP system operates.

The first site 102 includes several devices including a server 110 and a switch 114. The first site 102 also includes communication devices such as an IP phone 104 and a soft phone 106. Also included within the first site 102 is a data storage device 108. Each of these components may communicate with each other via the network 120 or via a local network.

The switch 114 may be a telephone switch that communicates with the IP phone 104 and the soft phone 106 to establish communications channels that are used to make and receive calls. As used herein, the term calls refers broadly to any type of communications (e.g., phone calls, conference calls, video calls/conferences, text messaging, or other communications). The switch 114 may manage call setup and resource allocation by provisioning an extension for the IP phone 104 and the soft phone 106. In the example illustrated in FIG. 1, the switch 114 is also coupled to a public switched telephone network (PSTN) 116. The switch 114 and the PSTN 116 may be coupled via an analog or digital trunk line (e.g. a T1 or E1 interface). In the illustrated configuration, the switch 114 provides an interface between the VoIP system and the PSTN 116.

Other communication devices that are used to make or receive calls may also be included within the VoIP system and within each site. For example, although not shown in the example illustrated in FIG. 1, a VoIP system may include analog or digital phones, button boxes, "virtual phones" (e.g. extensions that are not assigned to a specific device), analog, digital, or IP trunks (e.g. endpoints that can make inbound and outbound calls to the PSTN and to other telephony systems), and other communication devices. Both fixed and mobile devices may be part of the VoIP system. Moreover, such devices may be part of the VoIP system temporarily or on a more permanent basis. For example, a desktop phone at an enterprise may be a more permanent part of a company's VoIP system. Alternatively, a mobile device may be part of the VoIP system on a more transient basis, such as when it is at a particular location during a certain time period. Additionally, a user may use a call manager program to make, receive, and manage calls on the VoIP system. In one embodiment, such a program may run on a device that is separate from a user's phone. In another embodiment, it may run on the phone device.

The server 110 may be configured to provide some of the applications in the VoIP system. For example, the server 110 may be configured as an MOH source to provide file-based MOH services for calls to or from communication devices within the VoIP system. The communication devices may include the IP phone 104 and the soft phone 106 as well as IP phones 132, 150 and soft phones 130, 148. In some embodiments, the server 110 may be configured to provide other applications (e.g., voicemail) as well. The server 110 may store data (e.g., MOH information and MOH files) in local memory or in the data storage 108.

In an embodiment, the server 110 may be linked directly to the data storage 108 as shown in FIG. 1. In another embodiment, the server 110 may be linked to the data storage 108 via the network 120 or a local network. The data storage 108 is configured to store and maintain data. The data storage 108 may be any conventional storage device or database, such as those powered by My SQL, Oracle, Sybase, and the like, or another data source such as an LDAP server.

The switch 114 and the server 110 typically include familiar software and hardware components. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

In some embodiments, the server 110 may include more than one server (e.g. a server cluster). Also, in some embodiments the server 110 may be configured to implement some or all of the features that are normally provided by the switch 114. Alternatively, the switch 114 may be configured to implement some or all of the features that are normally provided by the server 110. For example, the switch 114 may be configured as an MOH source that can provide file-based MOH services for calls to or from communication devices within the VoIP system.

In the VoIP system illustrated in FIG. 1, the second site 134 includes several devices including a server 126 and a switch 122. The second site 134 also includes communication devices such as an IP phone 132 and a soft phone 130. Also included within the second site 134 is a data storage device 128. Similar to the components within the first site 102, each of these components may communicate with each other via the network 120 or via a local network. Each of the components within the second site 134 may be configured in a manner similar to the components within the first site 102 described above.

In a similar manner, the third site 152 includes several devices including a server 144 and a switch 140. The third site 152 also includes communication devices such as an IP phone 150 and a soft phone 148. Also included within the third site 152 is a data storage device 146. Similar to the components within the other sites, each of the components within the third site 152 may communicate with each other via the network 120 or via a local network. Each of the components within the third site 152 may be configured in a manner similar to the components within the first site 102 described above.

The switch 140 in the third site 152 is coupled to a PSTN 138. The PSTN 138 may be coupled with various communication devices such as an external phone 136. The switch 140 and the PSTN 138 may be coupled via an analog or digital trunk line (e.g. a T1 or E1 interface). In the illustrated configuration, the switch 140 provides an interface between the VoIP system and the PSTN 138.

It is to be understood that FIG. 1 is presented merely as an exemplary embodiment to illustrate some of the features and functionality of the present invention. Not all distributed VoIP systems include the components shown in FIG. 1. Likewise, some distributed VoIP systems include additional components that are not shown in the VoIP system of FIG. 1. For example, in some configurations the components shown in FIG. 1 may be combined or provide functionality that is different from that described herein. Thus, the present invention can be embodied in many different forms and should not be construed as limited to the configurations set forth herein.

In accordance with some embodiments of the present invention, file-based MOH services may be provided in systems such as the VoIP system illustrated in FIG. 1. As an example, a call that is placed on hold and removed from hold multiple times can receive digital content from an MOH file in a sequence that appears uninterrupted. Each time the call is placed on hold, the digital content continues from where it left off a previous time the call was on hold.

In an embodiment, a switch may be configured as an MOH source in a VoIP system. The switch may track when calls are placed on hold and removed from hold. The switch may use this information to determine where to start playing an MOH file when a call is placed on hold. Digital content of the MOH file may be provided to a caller (or to a communication device used by the caller) using a media player running on the switch. The switch may establish a communications channel so that the digital content can be streamed from the switch to the communication device that is on hold.

In another embodiment, a server may be configured as an MOH source in a VoIP system. The server may receive information from a switch that can be used to determine where to start playing an MOH file when a call is placed on hold. Digital content of the MOH file may be provided to a caller (or to a communication device used by the caller) using a media player running on the server. The switch may establish a communications channel so that the digital content can be streamed from the server to the communication device that is on hold. In some embodiments, the digital content may streamed to a communication device such as a switch that converts the digital content to analog content for transmission to the caller. For example, a caller on a PSTN line may be put on hold, and digital content may be streamed from an MOH source to a switch handling the PSTN line. The switch may convert the digital content into analog content that can be provided to the caller.

Figure 2:
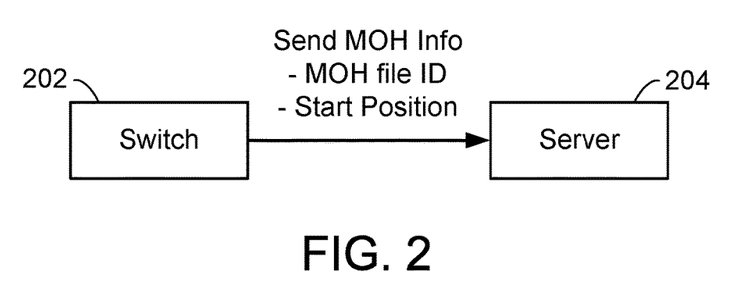
FIG. 2 is a simplified block diagram illustrating a method of providing a start position in an MOH file from a switch to a server in accordance with an embodiment of the invention.

FIG. 2 is a simplified block diagram illustrating a method of providing a start position in an MOH file from a switch 202 to a server 204 in accordance with an embodiment of the invention. The start position may be used by the server 204 to determine where to start playing the MOH file for a call that has been placed on hold. If this is a first time the call has been placed on hold, the start position may be the beginning of the MOH file. If the call has been placed on hold once before, the start position may be at approximately the same point where the MOH file stopped playing when the call was removed from hold. If the call has been placed on hold multiple times, the start position may be at approximately the same point where the MOH file stopped playing just prior to being placed on hold the last time.

In the example shown in FIG. 2, information provided from the switch 202 to the server 204 may include an MOH file ID and a start position. The MOH file ID may be used to identify a particular MOH file that is to be used for the call. The MOH file may be a default file that is used for all calls (or for all calls for which a MOH file ID is not specified). Alternatively, the MOH file may be one of a number of MOH files that are stored on the server (or accessible to the server). In some embodiments, the particular MOH file that is used for a call may be determined based on a number of factors. These factors may include the communication device making or receiving the call, timing of the call (time of day, day of week, etc.), and the like.

In some embodiments, for example, the MOH file may be selected based on an association of the communication device making or receiving the call with other communication devices in the VoIP system (e.g., the communication devices could be grouped by department and the MOH file used by one department may be different than that used by another department). In other embodiments, for example, the MOH file may be selected based on an inbound telephone number that is used for the call (e.g., a number of different telephone numbers may be routed to a main receptionist who answers the calls and forwards them on depending on the inbound telephone number). The inbound telephone number may be determined using a dialed number identification service (DNIS).

As explained previously, the start position may be used by the server to determine where to start playing the MOH file. In some embodiments, the switch 202 may store call information such as timestamps that indicate when calls are placed on hold and removed from hold. The timestamps may be used to determine the start position of the MOH file. In other embodiments, the call information may include length(s) of time that calls are on hold. This information can also be used to determine the start position of the MOH file.

Use of the information provided from the switch 202 to the server 204 can be illustrated with reference to the VoIP system shown in FIG. 1. Merely by way of example, assume a call from external phone 118 to the IP phone 104 is placed on hold by the IP phone 104. The call may be placed on hold at Time A, where the Time A is in any format including date and time of day, time elapsed since some event, or the like. The switch 114 may send information such as a MOH file ID and start position to the server 110. Alternatively, since this is the first time the call has been placed on hold, the start position may be omitted indicating that digital content is to be provided from a beginning of the MOH file. The server 110 sets up a MOH session by selecting the appropriate MOH file based on the MOH file ID and providing the digital content of the MOH file starting from the beginning. The digital content may be streamed to the external phone 118 from a media player running on the server 110.

The digital content is provided until the call is removed from hold. For purposes of illustration, the call may be removed from hold at Time B. In some embodiments, a channel used to stream the digital content may be cleared after the call is removed from hold using a teardown process in accordance with known techniques. In other embodiments, the channel may be kept open for a period of time so that it can be used again if the call is placed on hold a second time within the time period.

Continuing the above example, the call may be placed on hold by the IP phone 104 a second time at Time C. When the call is placed on hold the second time, the switch 114 may once again send information such as the MOH file ID and start position to the server 110. Since the call has already been on hold once, the start position may be determined by subtracting Time B from Time A. This delta indicates about how long the call was on hold the first time (and how long the MOH file played). The start position may be in any form, such as a delta time that is used to determine where to start playing the MOH file, or timestamps so that the start position can be computed at the server 110.

While the call is on hold the second time, the digital content may be streamed to the external phone 118. The call may be removed from hold at Time D. If the call were placed on hold one or more additional times, the switch 114 would send the MOH file ID and start position to the server 110. For each time the call is placed on hold, the start position may be determined from the timestamps of each previous time the call was placed on hold and removed from hold.

In embodiments where a switch is configured as an MOH source, the switch may also be configured to determine the correct MOH file for the particular call and to determine the start position for the MOH file. In this case the digital content may be streamed from the switch to the external phone 118 in a manner similar to the example provided above.

Figure 3:
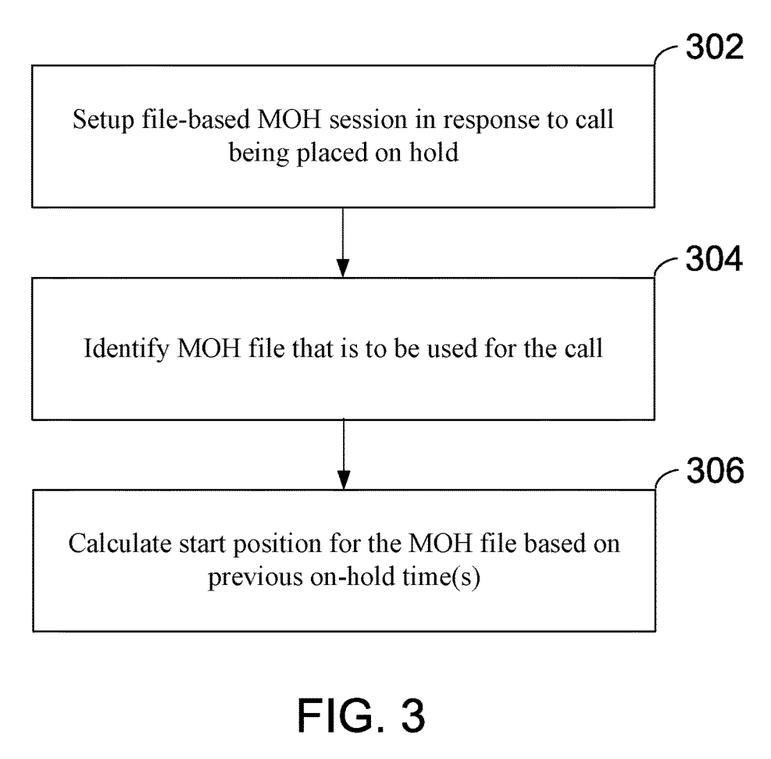
FIG. 3 is a flowchart illustrating a method of determining a start position in an MOH file in accordance with an embodiment of the invention.

FIG. 3 is a flowchart illustrating a method of determining a start position in an MOH file in accordance with an embodiment of the invention. An MOH session is set up in response to a call being placed on hold (302). In embodiments where a server is configured as an MOH source, the MOH session is set up at the server after receiving MOH information from a switch. The MOH information may include an MOH file ID and a start position. In embodiments where a switch is configured as an MOH source, the MOH session is set up at the switch in response to the call being placed on hold.

The MOH file that is to be used for the call is identified. The MOH file may be a default MOH file, it may be identified based on an MOH file ID, or it may be determined based on any number of factors as discussed previously.

A start position for the MOH file is calculated based on one or more previous on-hold times (306). In embodiments where a server is configured as an MOH source, the start position may be determined at a switch or at the server. The start position may be determined using timestamps or lengths of time as discussed previously. In some embodiments, an MOH source may be configured to loop the digital content of the MOH file so that it can be played continuously. In these embodiments, the start position may be at a point in the digital content that is before a start position that was used previously for the same call.

In accordance with other embodiments of the present invention, a VoIP system may revert to jack-based music on hold when file-based MOH services are unavailable. As an example, when a call is placed on hold, a switch (or server) in a VoIP system may search for a source for file-based MOH services that can be used to provide digital content to the caller. If no file-based MOH services are available, jack-based media may be provided. The file-based MOH services may be unavailable for any number of reasons, such as when a particular MOH file does not exist on a file-based MOH source. Also, the MOH services may be unavailable if a file-based MOH source has reached a maximum call limit and does not have resources to service additional calls.

Figure 4:
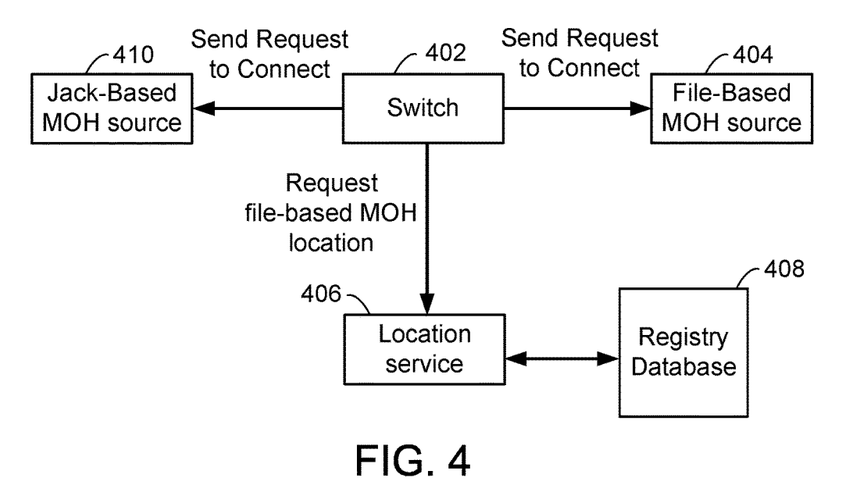
FIG. 4 is a simplified block diagram illustrating a method of identifying file-based MOH sources and using file-based MOH services or jack-based MOH services in accordance with an embodiment of the invention.

FIG. 4 is a simplified block diagram illustrating a method of identifying file-based MOH sources and using file-based MOH services or jack-based MOH services in accordance with an embodiment of the invention. In this example, a switch 402 (or server) may identify or locate MOH services for a call that has been placed on hold by sending requests to a file-based MOH source 404, a location service 406, and/or a jack-based MOH source. If the switch 402 is configured as an MOH source, these requests normally occur after the switch 402 has determined that it is unable to provide file-based MOH services for the call.

One request that may be sent is to the file-based MOH source 404. The file-based MOH source 404 may be a server or switch at the same site as the switch 402 that is configured as a file-based MOH source. If the file-based MOH source 404 is able to provide the file-based MOH services, an MOH session is set up and no further requests may be required. In some embodiments, the request may be sent to the file-based MOH source 404 before sending requests to the location service 406 of the jack-based MOH source 410.

Another request that may be sent is to the location service 406. The location service 406 may be a service that is provided by a server within a VoIP system. The location service 406 may be configured to locate or identify file-based MOH sources at other sites within the VoIP system. This information may be stored in a registry database 408. In some embodiments, the location service 406 may be configured to identify preferred file-based MOH source(s). For example, the location service 406 may identify a nearest file-based MOH source or a file-based MOH source that has current availability and can provide MOH services for the call. The switch 402 may send multiple requests to the location service 406 if an MOH source identified by the location service 406 is unable to provide file-based MOH services for the call. In some embodiments, there may not be an MOH file-based source 404, and a first request may be sent to the location service 406.

Another request that may be sent is to the jack-based MOH source 410. In some embodiments, this request is sent only after sending requests to the file-based MOH source 404 and the location service 406 and no file-based MOH services are available for the call. In an embodiment, the switch 402 may be configured as the jack-based MOH source 410 and the request may be an internal request to establish a connection to provide jack-based MOH services for the call. Alternatively, the jack-based MOH source 410 may be another device at the same or a different site within the VoIP system.

Figure 5:
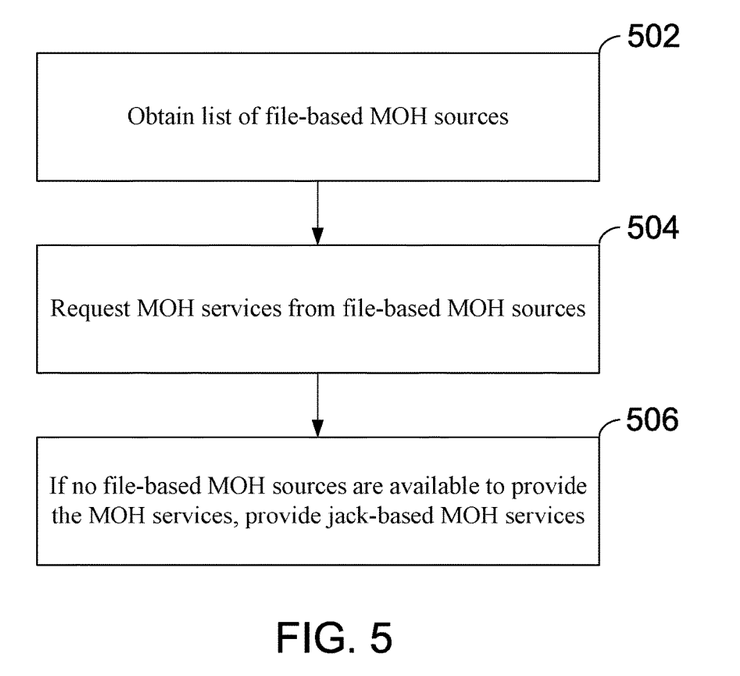
FIG. 5 is a flowchart illustrating a method of using jack-based MOH services as a backup for file-based MOH services in accordance with an embodiment of the invention.

FIG. 5 is a flowchart illustrating a method of using jack-based MOH services as a backup for file-based MOH services in accordance with an embodiment of the invention. The method may be performed by a switch or server within a VoIP system to provide MOH services to a call that has been placed on hold. The call may be between two or more communication devices where at least one them is part of the VoIP system (e.g., an IP phone or a soft phone).

A list of file-based MOH sources may be obtained (502). The list may include one or more file-based MOH sources within the VoIP system. The list may be obtained from local memory or it may be provided by a location service as explained previously. MOH services are requested from the file-based MOH sources on the list (504). If no file-based MOH sources are available to provide the MOH services, jack-based MOH services may be provided (506).

In accordance with other embodiments of the present invention, a periodic tone (e.g., a "beep") may be provided while a call is on hold rather than providing file-based MOH services. Providing a periodic tone (or tone-based MOH services) requires far fewer resources and bandwidth than providing file-based MOH services. As an example, when a call is placed on hold, a server in a VoIP system may determine how much bandwidth is available to provide file-based MOH services. Available bandwidth may be determined in accordance with known techniques. If the available bandwidth is less than a predetermined threshold, a periodic tone may be provided while the call is on hold. If the available bandwidth is greater than the predetermined threshold, the file-based MOH services may be provided.

Figure 6:
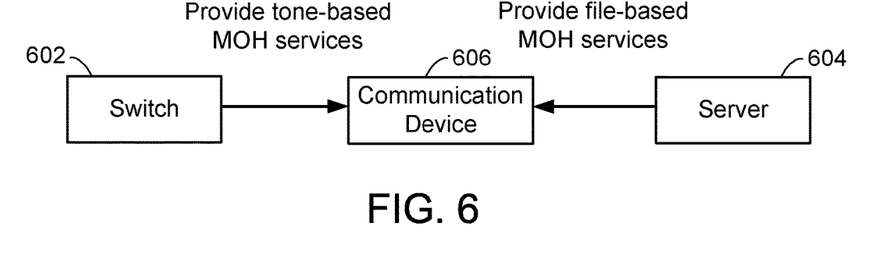
FIG. 6 is a simplified block diagram illustrating a method of providing file-based MOH services or tone-based MOH services in accordance with an embodiment of the invention.

FIG. 6 is a simplified block diagram illustrating a method of providing file-based MOH services or tone-based MOH services in accordance with an embodiment of the invention. In this example, a switch 602 can provide tone-based MOH services to a communication device 606 while a call is on hold, or a server 604 can provide file-based MOH services to the communication device 606 while the call is on hold. The tone-based MOH services may simply include a periodic tone that lets a caller know the call is on hold, or they may include a series of different tones. The tone may be provided by the communication device that put the call on hold, or by a switch or server within a VoIP system.

The decision to provide tone-based MOH services or file-based MOH services can be based on a number of variables. For example, in some embodiments available bandwidth may be used to determine which services to provide as explained above. In other embodiments, the decision may be based on the communication devices participating in the call. As an example, tone-based MOH services may be provided to calls between communication devices that are both part of a VoIP system but are at different sites (such as IP phone 106 and IP phone 132 in FIG. 1). This reduces the load on resources and bandwidth within the VoIP system. As another example, file-based MOH services may always be a first option for calls where at least one of the communication devices is external to the VoIP system (e.g., external phone 118 in FIG. 1). These calls are more likely to involve customers or outside parties for which messages, instructions, or advertisements may be particularly useful. Any number of similar criteria may be utilized to implement procedures to determine whether to provide tone-based MOH services or file-based MOH services in a particular situation.

Figure 7:
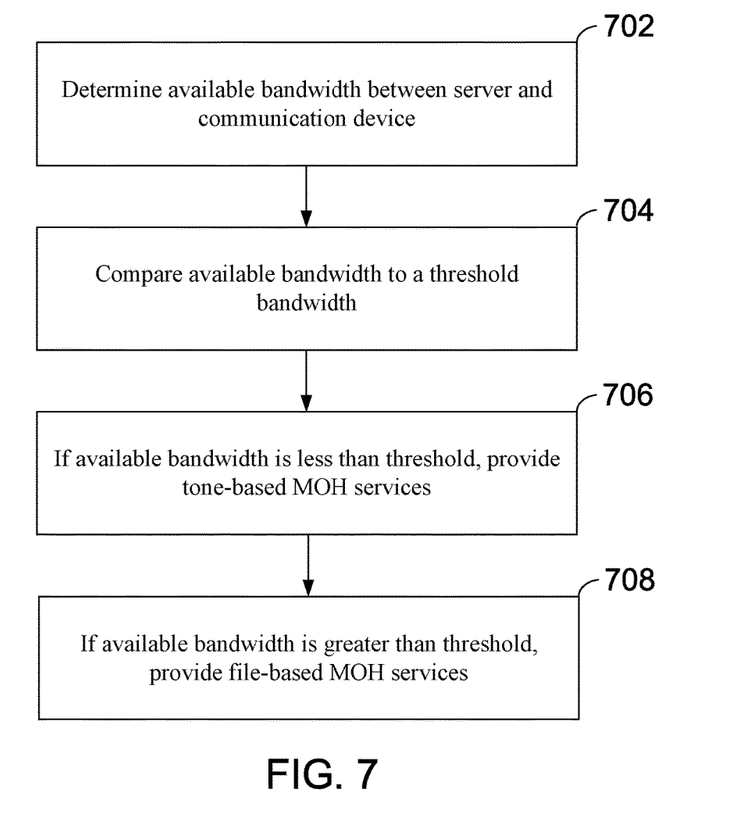
FIG. 7 is a flowchart illustrating a method for determining whether to use file-based MOH services or tone-based MOH services in accordance with an embodiment of the invention.

As an example, FIG. 7 is a flowchart illustrating a method for determining whether to use file-based MOH services or tone-based MOH services in accordance with an embodiment of the invention. The method may be performed by a switch or server within a VoIP system to provide MOH services to a call that has been placed on hold. The call may be between two or more communication devices where at least one them is a part of the VoIP system (e.g., an IP phone or a soft phone).

Available bandwidth between a server and a communication device is determined (702). This provides a measure of the bandwidth available to provide file-based MOH services from the server to the communication device. The available bandwidth is compared to a threshold bandwidth (704). The threshold bandwidth may be static or dynamic, or it may be based on other utilization factors or expected utilization factors within the VoIP system. If the available bandwidth is less than the threshold, tone-based MOH services may be provided while the call is on hold (706). If the available bandwidth is greater than the threshold, file-based MOH services may be provided while the call is on hold.

It should be appreciated that the specific steps illustrated in FIGS. 3, 5, and 7 provide particular methods for providing file-based MOH services in a VoIP system according to some embodiments of the present invention. Other sequences of steps may also be performed according to alternative embodiments. For example, alternative embodiments of the present invention may perform the steps outlined above in a different order. Moreover, the individual steps illustrated in FIGS. 3, 5, and 7 may include multiple sub-steps that may be performed in various sequences as appropriate to the individual step. Furthermore, additional steps may be added or removed depending on the particular application.

It should be appreciated that some embodiments of the present invention may be implemented by hardware, software, firmware, virtual machine, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. The scope of the present invention should be determined not with reference to the above description, but should be determined with reference to the appended claims along with their full scope of equivalents.

What is claimed is:

1. A method comprising:
   establishing a call between a first communication device and a second communication device, wherein the first communication device is part of a VoIP system;
   placing, by the first communication device, the call on hold;
   requesting, by a switch within the VoIP system, file-based media on hold services for streaming digital content to the second communication device;
   streaming, by the switch, digital content from the file-based media on hold services to the second communication device while the call is on hold when the file-based media on hold services are available; and
   when no file-based media on hold services are available to provide media on hold services, providing, by the switch, a jack-based media to the second communication device while the call is on hold as a backup for the file-based media on hold services.

2. The method of claim 1, wherein the call originates from the first communication device.

3. The method of claim 1, wherein the call originates from the second communication device.

4. The method of claim 1, wherein the switch is configured as a file-based media on hold source.

5. The method of claim 1, wherein when the file-based media on hold services are unavailable, determining if a particular media on hold file does not exist on a file-based media on hold source.

6. The method of claim 1, wherein when the file-based media on hold services are unavailable, determining if a file-based media on hold source has reached a maximum call limit.

7. The method of claim 1, wherein when the file-based media on hold services are unavailable, sending a request to a file-based media on hold source.

8. The method of claim 1, wherein when the file-based media on hold services are unavailable, sending a request to another file-based media on hold source in the VoIP system separate from the switch.

9. The method of claim 1, wherein when the file-based media on hold services are unavailable, sending a request to a location service within the VoIP system.

10. The method of claim 1, wherein when the file-based media on hold services are unavailable, sending multiple requests to a location service within the VoIP system.

11. The method of claim 1, wherein when the file-based media on hold services are unavailable, obtaining a list of a file-based media on hold sources within the VoIP system.

12. A VoIP system comprising:
a first communication device configured to enable a call between the first communication device and a second communication device; and
a switch configured to request a file-based media on hold services for streaming digital content to the second communication device when the call is placed on hold;
wherein when the file-based media on hold services are available, digital content from the file-based media on hold services is streamed to the second communication device while the call is on hold; and
wherein when no file-based media on hold services are available to provide media on hold services, a jack-based media is provided to the second communication device while the call is on hold as a backup for the file-based media on hold services.

13. The system of claim 12, wherein the second communication device is an analog phone that is external to the VoIP system.

14. The system of claim 12, wherein the call originates from the first communication device.

15. The system of claim 12, wherein the call originates from the second communication device.

16. The system of claim 12, wherein the switch is configured as a media on hold source.

17. The system of claim 12, further comprising a jack-based media source for the jack-based media.

18. The system of claim 12, wherein when the file-based media on hold services are unavailable, determining a file-based media on hold source has reached a maximum call limit.

19. The system of claim 12, wherein when the file-based media on hold services are unavailable, sending a request to another file-based media on hold source in the VoIP system separate from the switch.

20. The system of claim 12, wherein when the file-based media on hold services are unavailable, obtaining a list of a file-based media on hold sources within the VoIP system.

\* \* \* \* \*